(12) United States Patent
Le Van Suu

(10) Patent No.: US 6,385,599 B1
(45) Date of Patent: *May 7, 2002

(54) METHOD AND APPARATUS FOR A FUZZY SELF-ADAPTIVE CONTROL SYSTEM

(75) Inventor: Maurice Gilbert Le Van Suu, Romainville (FR)

(73) Assignee: SGS-Thomson Microelectronics S.A., Gentilly (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/845,331

(22) Filed: Apr. 25, 1997

(30) Foreign Application Priority Data

Apr. 26, 1996 (FR) .............................. 96 05332

(51) Int. Cl.$^7$ ................................. G06N 7/02
(52) U.S. Cl. ....................... 706/1; 318/102; 318/561
(58) Field of Search ....................... 706/1; 318/102, 318/561; 399/12, 42; 364/187

(56) References Cited

U.S. PATENT DOCUMENTS

| | | | | |
|---|---|---|---|---|
| 4,985,824 A | * | 1/1991 | Husseiny et al. | 364/187 |
| 5,285,545 A | * | 2/1994 | Payne et al. | 8/158 |
| 5,306,995 A | * | 4/1994 | Payne et al. | 318/561 |
| 5,317,368 A | * | 5/1994 | Shimomura et al. | 399/12 |
| 5,412,291 A | * | 5/1995 | Payne et al. | 318/102 |
| 5,446,523 A | * | 8/1995 | Shimomura et al. | 399/42 |
| 5,452,438 A | * | 9/1995 | Umeda et al. | 395/180 |
| 5,619,614 A | * | 4/1997 | Payne et al. | 706/1 |

FOREIGN PATENT DOCUMENTS

WO    WO 93 09509    5/1993    ........... G06F/15/50

OTHER PUBLICATIONS

Kosko, Bart, Neural Networks and Fuzzy Systems: Dynamical Systems Approach to Machine Intelligence, Prentice Hall, Jan. 1992.*

Kosko, Bart, Neural Networks and Fuzzy Systems: A Dynamical Systems Approach to Machine Intelligence, Jan. 1992.*

Kosko, Bart, Neural Networks and Fuzzy Systems: A Dynamical Systems Approach to Machine Intelligence, 1992, pp. 326–327.*

Multi–Sensor Integration System with Fuzzy Inference and Neural Network, Fukuda et al.vol. 2, Jun. 7, 1992, pp. 757–762.

* cited by examiner

Primary Examiner—Kakali Chaki
Assistant Examiner—Wilbert L. Starks, Jr.
(74) Attorney, Agent, or Firm—Wolf, Greenfield & Sacks, P.C.; James H. Morris

(57) ABSTRACT

To resolve a problem of the repairing of an electronic system, a machine will undergo a learning stage during the replacement of a part of the machine. This learning stage can be monitored manually or automatically on a limited range of variation. During this learning stage, readings are taken of the resultant modifications on a structure of the membership functions and of interference rules, memorized in a fuzzy logic program that controls the machine. These membership functions and/or theses rules are then modified as a function of this results. It is shown that it is possible, in this way, to repair a machine without replacing a defective part by a strictly identical part and without having to bring the machine back to the laboratory.

51 Claims, 2 Drawing Sheets

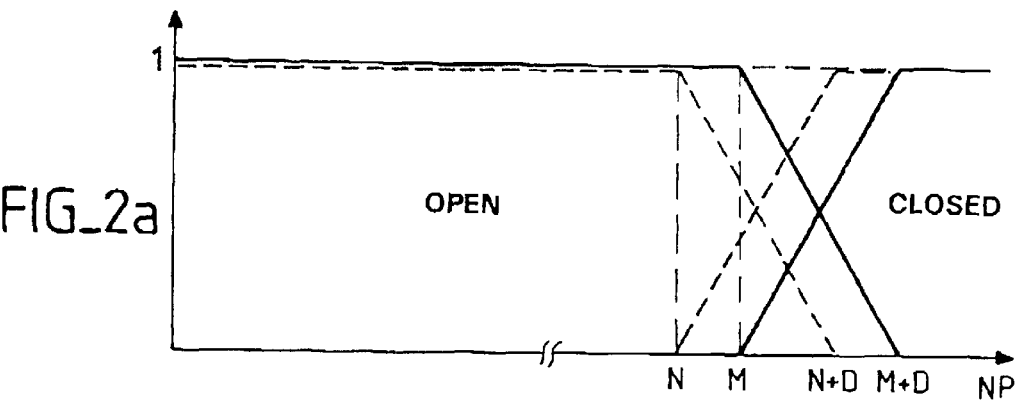
FIG_2a
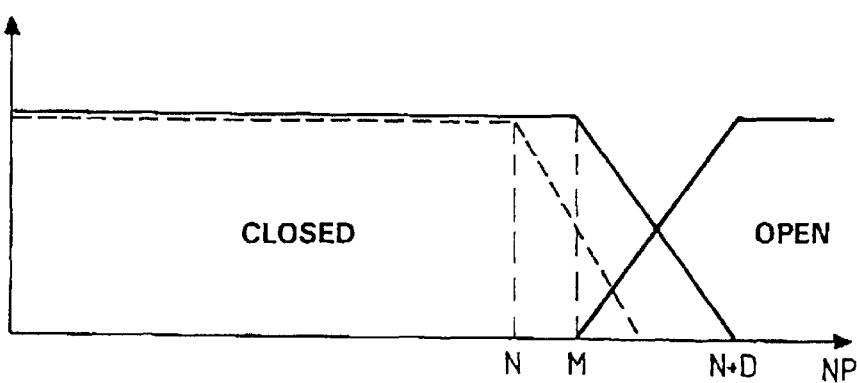
FIG_2b
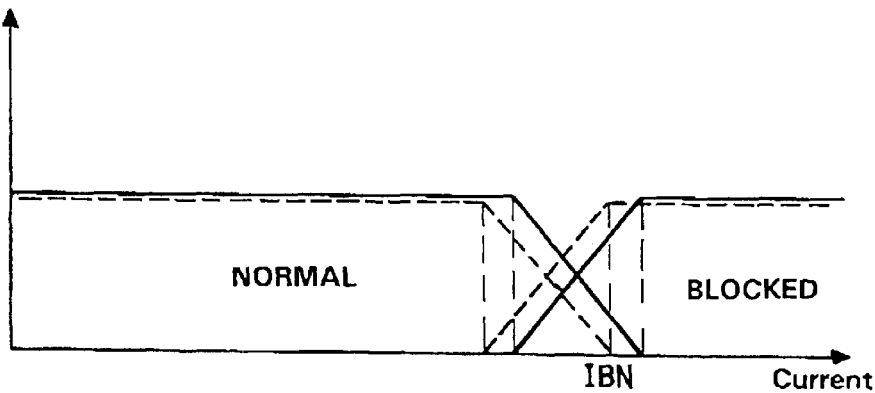
FIG_2c

METHOD AND APPARATUS FOR A FUZZY SELF-ADAPTIVE CONTROL SYSTEM

BACKGROUND OF THE INVENTION

1. Field of the Invention

The invention relates to the devising, installation or repairing of an electronic system and in particular to the devising, installation and repairing of a machine controlled by a fuzzy logic program.

2. Discussion of the Related Art

The control of a machine by a fuzzy logic program requires the measurement of measurement data elements by one or more sensors. These measurement data elements are then assigned to brackets of operation, of measurement, that correspond to a dynamic range of measurement of the sensor. These brackets, assessed by membership coefficients, form functions of membership of this measurement. They are also called universes of discourse of the variable constituted by the measurement data element. In general, the number of brackets is small: five brackets, or even two brackets. The measurement performed may be imprecise without leading to any erratic control of the machine. Furthermore, in the memory of the microprocessor, a set of rules of the following type is stored: "If the measurement data belongs to a given bracket, then the control of the machine must be of such a type".

One problem arises when the machine malfunctions or when the measurement sensor malfunctions. In normal maintenance, this motor or this sensor is replaced by an identical motor or sensor. It may happen, however, that an identical replacement motor or sensor is no longer available. The faulty device is then replaced by a motors or a sensor of a different or merely similar type. The matching of these new elements to the machine is not truly possible just with a conventional software-based approach.

In the field of fuzzy logic, without changing the set of rules and the set of membership functions memorized, the fuzzy model of the system remains reliable. However, the replacement of the measurement or control device leads to a difference in response by the system with respect to the dynamic range of measurement. The modification is then carried out only if there has been a preliminary fuzzy logic modeling of the modification of the machine due to the replacement of the motor, sensor or other device. This modeling calls for the return of the machine and of the microprocessor to the laboratory, which presents a problem in itself and does not make it easy to replace the different units of the machine.

SUMMARY OF THE INVENTION

It is an object of the invention to overcome this and related problems and avert situations where installations are written off when the replacement of certain parts is no longer possible, or when their modification makes them evolve into a range of equipment not planned initially. An aspect of the invention provides the microprocessor that implements the fuzzy logic with an external command by which it will be possible to control the machine manually so as to make it explore its entire dynamic range of development when this command is made.

During a learning stage, measurement data elements pertaining to this exploration may then be acquired, in particular in a central processing unit that has a network type connection with the machine. In this microprocessor, or in this central processing unit, membership functions and/or modifying rules are then prepared. Then, the set of membership functions or the set of rules of the fuzzy logic microprocessor are then modified with these rules or these modifying functions. As the situation dictates, a new set of membership functions may be inserted. The learning procedure is then stopped. It can be seen then that the machine can subsequently work exactly or effectively the same as it worked before, with the same commends applied from the exterior, without the modification resulting in a wrong interpretation of these external commands.

An illustrative embodiment of the invention is directed to a method for the management of an electronic system comprising a central processing unit, a machine, a microprocessor and its memory, and at least one measurement sensor, the machine being controlled by the microprocessor according to a fuzzy logic program. Membership functions are prepared and recorded in the memory of the microprocessor, these membership functions setting up correspondence between measurement data elements and coefficients of membership of these measurement data elements in measurement brackets. Additionally, rules are prepared and recorded, in the memory of the microprocessor, for the control of this machine as a function of the values of these membership coefficients, and measurement data elements delivered by the sensor are read. The result of the control rules for the measurement data elements read may then be computed, and the machine controlled accordingly. As discussed above, the measurement sensor and/or the machine is replaced when it is defective. Then, to adjust this electronic system after this replacing operation, the system is made to develop between two identified points of operation, the measurement data elements corresponding to these two points are read, membership functions and/or modifying rules are prepared, and the membership functions and/or the rules recorded are modified as a function of these modifying rules.

The membership functions and the rules may be modifying rules, local rules or specific rules.

BRIEF DESCRIPTION OF THE DRAWINGS

The invention will be understood more clearly from the following description and from the figures that accompany it. These figures are given purely by way of an indication and in no way restrict the scope of the invention. Of these figures:

FIGS. 2a, 2b, and 2c each show an exemplary modification of a membership function of the memorized fuzzy logic program, following the changing of a motor of a machine illustrated in FIG. 1.

DETAILED DESCRIPTION

Figure 1:
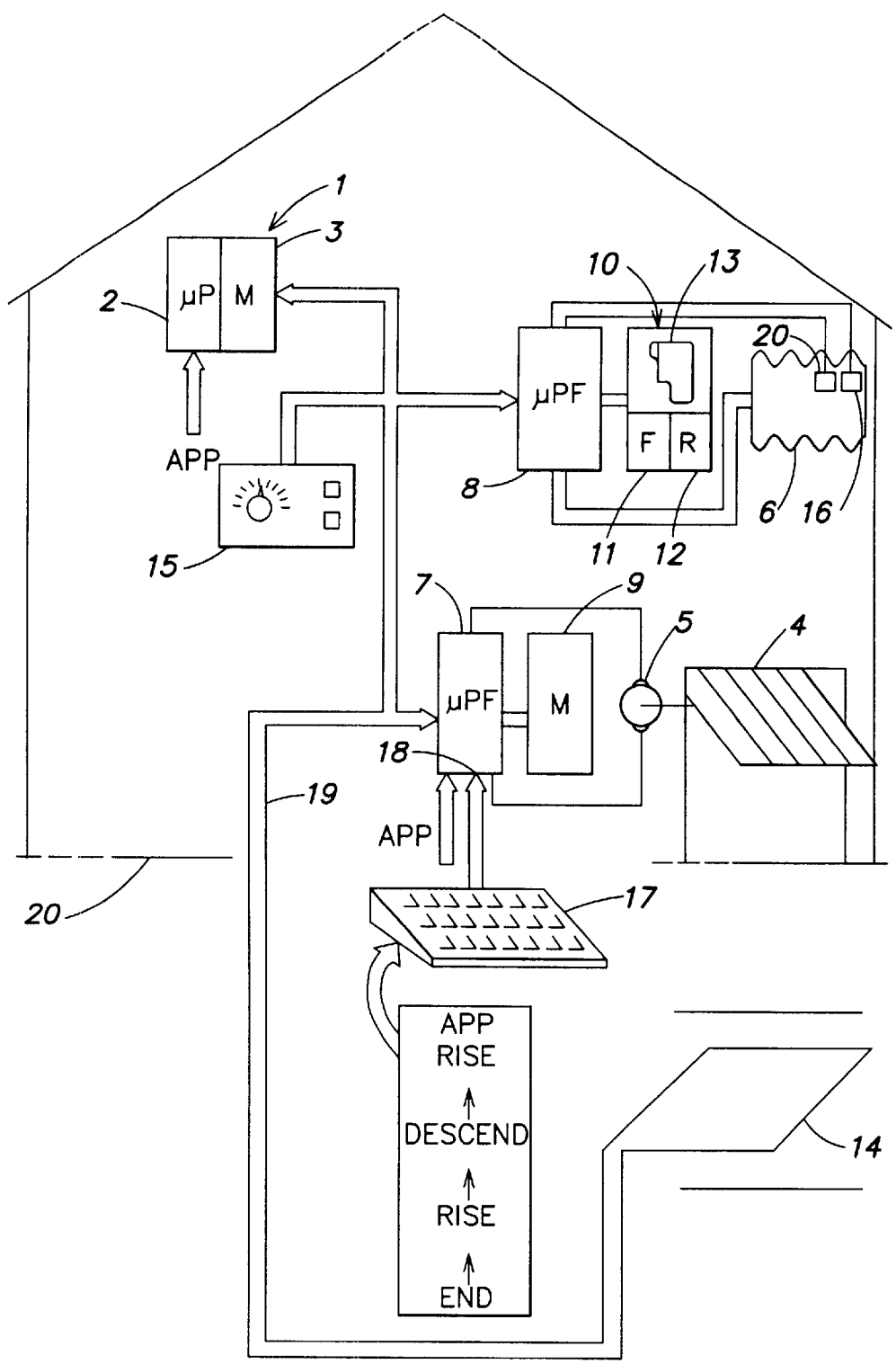
FIG. 1 shows a domestic installation in which the method of management at least one embodiment of the invention may be implemented.

An object of the present invention is a method for the management of an electronic system. The electronic system in question comprises essentially an electrical machine controlled by a microprocessor. In order that it may be able to control the machine, a microprocessor has a memory in which, according to the invention, a fuzzy logic program is recorded.

The invention shall be described in the context of two examples of use in home automation systems, the repairing of the motor of a garage door and the repairing of a thermal regulation temperature sensor for a radiator or an oven in a domestic or industrial heating installation. This description will enable the invention to be placed in the context of the management of a network of machines. However, although this network management is an illustrative application of the invention, the invention will be useful even if the machines are independent of one another.

FIG. 1 shows an installation, a house 20, in which the method of management of the electronic system of an illustrative embodiment of the invention may be implemented. The electronic system concerned herein comprises a central processing unit (CPU) 1 comprising an arithmetic and logic unit, typically a microprocessor ($\mu$P) 2, and a memory (M) 3. The electronic system also comprises a machine. This machine may be a garage door 4 and the motor 5 for opening and shutting this door 4, or it may be an electric radiator 6. The term "machine" therefore refers to any electrical machine provided with an activating device. In this embodiment, each machine has a fuzzy logic processor, $\mu$PF, respectively referenced 7 and 8, each associated with a memory 9 and 10 respectively. In the memories 9 and 10, fuzzy logic programs are stored. These fuzzy logic programs comprise tables 11 of membership functions and sets rules of 12 also known as inference drivers. The program may further comprise a logic program 13 organizing the reading of the tables 11, the computation of the result of the application of the rules 12 and the organization of all these tasks to control the respective machine.

To control the appropriate machine, there also exist external commands of the magnetic pedal 14 type in the case of the opening of the garage door 4, or of the thermostat 15 type in the case of the radiator 6. An operator activates the devices 14 and 15 so as to dictate a given line of behavior or line of progress on the machines 4 and 6 respectively through microprocessors 7 and 8.

The systems that are an object of the invention also comprise at least one measurement sensor. In the case of the motor 5 driving the door 4, there may be two of them which, in practice, are included in the microprocessor 7. A first sensor may quite simply be a counter that counts the steps of the motor 5 when it is a stepping motor. A second sensor may be a sensor measuring the current that flows into the motor 5. To this end, the microprocessor 7 may comprise a sampling device that is connected to a supply wire of the motor 5 and is linked to an analog-digital converter to have this measurement result available in binary form. In the case of the radiator 6, there is at least one sensor, for example the sensor 16 which is a thermistor, for example with a negative temperature coefficient (NTC). All these devices are connected to one another by a data, address and control bus 19.

The working of these systems is such that the sensors provide the microprocessors 7 and 8 respectively with their measurement data elements. These sensors cause the microprocessors to apply the programs contained in the memory 9 and 10 and prompt the activation of the motor 5 or the setting up of heating current in the electrical radiator 6. The programs implemented by the microprocessors 7 and 8 are fuzzy logic programs whose running comprises at least the computation of a coefficient of membership of a measurement data element read in a measurement bracket in the dynamic range of measurement of this sensor. For this coefficient of membership of this measurement in this bracket, the result of rules of the IF-THEN type are computed. This enables the preparation of a value of a control signal applied herein either to the motor 5 or to a switch for putting into operation the heating resistor of the radiator 6. To simplify matters, this control signal may take the form of a pulse-width modulated (PWM) signal.

A problem resolved by at least one embodiment of the invention is one resulting from the replacement of the motor 5 or the sensor 16 by devices that are identical but have characteristics that are not well controlled or by devices of different design. According to an aspect of the invention, this problem is resolved by performing a learning stage. This learning stage may be dictated by an external command applied either to a microprocessor, the microprocessor 7, or to the central processing unit, namely the processing unit 1. The command for dictating the learning stage may neutralize the action of the microprocessor 7 or 8 inasmuch as it is exerted to control the behavior of the machine.

For example, this command may be applied to the microprocessor 7 with a keyboard 17 temporarily connected to this microprocessor 7 at an input/output port 18 of this microprocessor 7. The same of course may be the case with the processing unit 1 if it is not already supplied with a control keyboard. With this keyboard 17, a series of instructions may be sent out enabling the operator handling the keyboard 17 to make the machine progress between the two points of operation of its dynamic range. The two points of operation may be two limits of this dynamic range.

To this end, by a first operation on the keyboard 17, an instruction APP is sent out. By this instruction, the microprocessor 7 places itself in learning mode, in which the microprocessor 7 hands over control and the keyboard 17 controls the operation. By acting in this way, the microprocessor 7 does not process the commands coming from the keyboard. These commands are applied for example as such to the motor 5. The instruction APP is also transmitted by the bus 19 to the central processing unit 1 which will go into a condition of recording the measurement data elements prepared by the sensors, including the binary signals delivered by the analog-digital converters of the microprocessor 7. In one embodiment, the microprocessor 7 is capable of carrying out this recording.

Then, the operator sends the keyboard a second command, an instruction RISE. Under these conditions, the motor 5 is switched over to enable the opening of the door 4, i.e. to make it rise. This rise is subsequently controlled and activated manually by the operator. The operator, for this purpose, presses a command key on the keyboard, for example a key with a vertical arrow. He presses this key for as long as he wishes to keep the motor activated. If necessary, the operator by successive small strokes then brings the door 4 to a mechanical stop against one of its ends. Then, the operator programs an instruction DESCEND. By then pressing another vertical key, for as long as is necessary, he closes the door. During this descent, a counter of the microprocessor 7 counts the number of steps performed by the motor 5 that has just been switched over. Similarly, an analog-digital converter of the microprocessor 7 delivers a signal pertaining to the value of the current flowing into the motor 5 during this action. By successive small strokes, towards the end, the operator closes the door 4 completely. In doing so, it is possible to have stored in the memory of the processing unit 1 or possibly in the memory 9 the number of steps necessary for the motor 5 to conduct the closing operation and the value of the current of this motor during the operation.

Then, the operator may apply the instruction RISE again, for example, by pressing the first vertical arrow. It is possible to measure the same characteristics (e.g., number of steps, current) for the rising operation. However, before controlling the rising operation with the first rising vertical arrow, the operator may press the vertical descent arrow (i.e., while the door is already closed). In this way, he acquires a measurement of the current that flows into the motor when the door gets blocked (i.e. impeded).

When these operations of acquisition are ended, the operator enters a terminating instruction END through the keyboard. This instruction END has two purposes. First, it hands back control to the microprocessor 7, and second, it is interpreted by the processing unit 1 or the microprocessor 7 as an end of acquisition of learning. The processing unit 1 will then compute the modification of the membership functions or of the corresponding rules of composition.

FIGS. 2a to 2c show the effect of this learning stage.

FIG. 2a shows the membership function corresponding to the number of steps NP performed by the motor to close the door. For example, so long as this number of steps is smaller than a number M, it will be assumed that the door is open and therefore the membership function sets up a correspondence with a membership coefficient equal to 1. When this number of steps becomes M+D or greater, it will be said that the membership coefficient with the membership function OPEN is zero, and the door is closed. To the contrary, the membership coefficient with the membership function CLOSED becomes 1. The membership functions shown in FIGS. 2a and 2b are trapezoidal membership functions. The membership coefficients go linearly from 1 to 0 and from 0 to 1 respectively at the end and the start of these functions. There are known ways however of making other shapes, notably Gaussian or even triangular shapes, which are equally applicable to embodiments of the invention.

The replacement of a former motor by a new motor 5 of a different type may lead to a situation where the number of steps of this motor is different. This may be the case, for example, when the upper ring of a motor is smaller than the upper ring of the original motor. In this case, the number of steps counted for one and the same number of rotations used to close the door will be smaller. Furthermore, it is possible to keep the same motor and quite simply change either the gearing and its reduction or the length of a lever arm for lifting the door. This ultimately means that the number of steps corresponding to the same motion with the previous arrangement will be smaller (or greater) than the previous one. At the end of the DESCEND operation referred to here above, the counter of steps will possess a new number of steps N+D. This end of the DESCEND operation occurs at the time when the instruction RISE is launched. From this new number N+D, it is possible to deduce the new number N constituting the borderline value of the coefficient 1 of the membership function OPEN. This entails the assumption that this change has not had any effect on the value D. As an initial approximation, this is true. By acting in this way, it is therefore possible to measure the modification of the shape of the membership function. Of course, the corresponding modification of the membership function CLOSED pertaining to the closing of the door will be deduced therefrom. It is possible, instead of modifying the membership functions, to add such functions in order to take account for example of a local non-linearity of the signal detected by the sensor.

To this end, this linearity may first be measured by reading characteristic values of measurement at several points (for example chosen in advance or evenly distributed) of the dynamic range of development of the phenomenon. This reading may be achieved by actions launched by the operator according to a protocol communicated to him in advance. Once these values are read, the processing unit 1 or the microprocessor 7 could implement a program of the WARP type produced by the firm SGS THOMSON MICROELECTRONICS. This program is capable of defining and computing the useful membership functions.

FIG. 2b shows operations that are the same as those of FIG. 1a but pertain to the opening of the door. The figure indicates the number of steps M and N comparable to those of the closure. However, it is quite possible that the number of steps at opening will not be the same as the number of steps at closure.

In the same way, FIG. 2c shows the shape of the membership function of the current at closure. However, the membership function for the opening could have been shown. In FIG. 2c, the membership functions are again divided into two, namely one so-called normal membership function and one so-called blocked condition membership function. Owing to the modification of the motor or of the activating rod assembly, the membership function shown in solid lines would have to be modified to take the shape of the function shown in dashes. A new value of the blocked condition current IBN will be measured while the instruction RISE is launched and while the operator nevertheless presses the vertical arrow corresponding to the descent. From this blocked condition current value, it is possible to deduce the new shape of the membership function of the current. The principle of the invention therefore entails using the keyboard 17 to prompt a sequence of instructions such that they enable the exploration, with all the measurements made with the machine, of the dynamic range of variation of these measurements. The new functions of membership may then be deduced therefrom. The membership functions 11 are conventionally memorized in the memories 10 in table forms It is easy to replace the contents of the tables that have been modified.

Naturally, the list of the successive operations launched with the keyboard 17 can be stored in a control pack connected to the port 18. With a single key on this control pack, it is possible to activate the exploration.

This is particularly possible for example in the case of the radiator 6 for which the memory 3 of the central processing unit 1 has a program of this type. This program may be launched by applying a learning instruction APP directly to the arithmetic and logic unit 2 of the processing unit 1.

For this last learning stage, in order to make the operation complete, the modification of the sensor 16 has been taken into consideration. According to an embodiment of the invention, to make it possible to take account more easily of the replacement of a sensor by another different type of sensor or a sensor with different characteristics, the sensors have quite simply been duplicated in such a way that the sensor 16 is close to another sensor 20 of the same type (or subsequently of a different type). At the outset, when the machine has been delivered, the two sensors have at least membership functions that are known if not identical.

The two membership functions may be identical or may be offset with respect to each other. These offsets may be known. During the replacing of a sensor according to the invention, it is enough, for the replacement sensor, during the learning sequence, to measure the values that this sensor gives while the other one, by these measurements, indicates the membership functions in which the system is located. For example, with respect to temperature measurements, there may be three membership functions entitled COLD, NORMAL, HOT. Thus, it may be said that the limit of the COLD membership function of the new sensor is reached when the signal delivered by the sensor that has not been replaced reaches it own COLD membership function limit. The same can be done for the start of the NORMAL membership function and the corresponding trapezoidal shapes may be deduced therefrom. Then, in going beyond the NORMAL membership function, it is possible, for the new sensor, to measure the signal that it delivers when the sensor that has not been replaced indicates the end of the NORMAL membership function and then the start of the HOT membership function. In a certain way, during the learning operation, the dynamic range of one sensor will be calibrated with the dynamic range of the other. For this purpose, it is enough to have two sensors.

It may be difficult, especially in the case of heating, to explore the entire dynamic range. Indeed, if it is summer, it is possible that the temperature delivered by a sensor will not be able to reach the COLD zone. In this case, the operation can be limited to the measuring of at least one of the membership function limits of a sensor and to the deduction or the deduction by arbitrary arithmetic shift, as the case may be, of the limits of the other membership functions for the new sensor.

Once the learning operation has ended, new tables may be made available at least in the central processing unit 1, providing the new membership functions of the system. Through the bus 19, the new membership functions are then remote loaded into the memories 9 and 10. This operation is performed as soon as the operation END has been launched.

It can furthermore be seen that, in the case of the measurement of temperature, the entire membership function may be automated. For example, it may be decided to stop the heating with the radiator 6 as soon as the membership function of the sensor, which has not been replaced, corresponds to the hot temperature, possibly with a time lag of some minutes.

It is possible, in certain cases, for the membership functions thus measured to have a more complex distribution than in the simple example shown. For example, in the case of an electronic balance in which one of the sensors has been replaced and for which the linearity of the indicator of weight measurement given by the balance is great, it may be desirable to change the rules memorized in the memories 9 and 10. For this purpose, the learning procedure will comprise, according to the sequences shown in FIG. 1, an expected sequence of instructions corresponding to an expected sequence of manual operations performed by an operator on the object to be calibrated. There are known ways, especially with the WARP processor from the firm SGS THOMSON MICROELECTRONICS and the associated program, of preparing the modifying membership functions accordingly.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only, and not intended to be limiting. The invention is limited only as defined in the following claims and the equivalents thereto.

What is claimed is:

1. A method for managing an electronic system having a central processing unit, a machine, a microprocessor and memory, and at least one measurement sensor, the machine being controlled by the microprocessor according to a fuzzy logic program, the method comprising the steps of:

preparing membership functions and recording the membership functions in the memory, the membership functions setting up correspondence between measurement data elements and coefficients of membership of the measurement data elements in measurement brackets;

preparing rules and recording the rules in the memory of the microprocessor, for the control of the machine as a function of values of the membership coefficients, reading measurement data elements delivered by the at least one measurement sensor;

computing a result of the rules for the measurement data elements read in the step of reading;

controlling the machine in accordance with the result of the rules;

replacing at least one of the at least one measurement sensor and the machine; and adjusting the electronic system after the step of replacing including the steps of:

operating the system between two identified points of operation reading measurement data elements corresponding to the two identified points of operation;

providing modifying rules based upon the measurement data elements corresponding to the two identified points of operation;

modifying at least one of the membership functions and the rules as a function of the modifying rules; and operating the system with the modified rules.

2. The method of claim 1, wherein:

the measurement data elements corresponding to the two identified points of operation are transmitted to the central processing unit;

the central processing unit prepares the modifying rules; and the central processing unit transmits the modifying rules to the microprocessor.

3. The method of claim 1 wherein:

the microprocessor and memory are provided with a program to activate the machine as a function of instructions received from an entity external to the machine; and the system is controlled to operate between the two identified points of operation in response to a control keyboard connected to the microprocessor.

4. The method of claim 1 wherein:

the microprocessor and memory are provided with a program to activate the machine as a function of instructions received from the exterior, and the system is controlled to operate between the two identified points of operation in response to a program recorded in the central processing unit.

5. The method of claim 1, wherein:

the at least one sensor includes a plurality of sensors, and wherein the step of reading measurement data elements corresponding to the two identified points of operation includes reading from each of the plurality of sensors.

6. The method of claim 1, wherein the at least one sensor is duplicated to calibrate the signals of a sensor as a function of the signals of another sensor.

7. The method of claim 1 wherein the central processing unit is connected to the microprocessor by a local network.

8. A method according to claim 1 wherein the rules and membership functions are modified locally at the memory.

9. A method for operating a system controlled by a fuzzy logic program in response to a replacement of a device previously within the system with a new device, the method comprising the steps of:

controlling the system including the new device, to determine a corresponding modification to the fuzzy logic program by operating the system between two identified points of operation, reading measurement data elements corresponding to the two identified points of operation, and providing modifying rules based upon the measurement data elements corresponding to the two identified points of operation;

changing the fuzzy logic program in accordance with the corresponding modification to create a modified fuzzy logic program; and operating the system with the modified fuzzy logic program.

10. The method of claim 9, wherein the step of modifying includes modifying a membership function of the fuzzy logic program.

11. The method of claim 9, wherein the step of modifying includes modifying at least one rule of the fuzzy logic program.

12. The method of claim 9, wherein the step of controlling includes controlling the system so that data that is output from the new device during the step of controlling ranges between two predetermined points of operation.

13. The method of claim 9, wherein the step of controlling includes automatically controlling the system in response to a calibration program that is included within the system.

14. The method of claim 9, wherein the step of controlling includes controlling the system in response to commands received from external to the system.

15. The method of claim 9, wherein the step of modifying includes replacing a portion of the fuzzy logic program containing a previous range of values that correspond to operation of the device previously within the system, with a new range of values that correspond to operation of the new device.

16. The method of claim 15, wherein the step of controlling includes controlling the system so that the new device outputs values that vary across the new range of values.

17. The apparatus of claim 15, wherein the means for controlling includes means for controlling the system so that the new device outputs values that vary across the new range of values.

18. An apparatus for operating a system controlled by a fuzzy logic program in response to a replacement of a device previously within the system with a new device, the apparatus comprising:

means for controlling the system including the new device, to determine a corresponding modification to the fuzzy logic program;

said means for controlling including means for operating the system between two identified points of operation, means for reading measurement data elements corresponding to the two identified points of operation and means for preparing modifying rules based upon the measurement data elements corresponding to the two identified points of operation;

means for modifying the fuzzy logic program in accordance with the corresponding modification to create a modified fuzzy logic program; and means for operating the system with the modified fuzzy logic program.

19. The apparatus of claim 18, wherein the means for modifying includes means for modifying a membership function of the fuzzy logic program.

20. The apparatus of claim 18, wherein the means for modifying includes means for modifying at least one rule of the fuzzy logic program.

21. The apparatus of claim 18, wherein the means for controlling includes means for controlling the system so that data that is output from the new device ranges between two predetermined points of operation in response to the means for controlling.

22. The apparatus of claim 18, wherein the means for controlling includes means for automatically controlling the system in response to a calibration program that is included within the system.

23. The apparatus of claim 18, wherein the means for controlling includes means for controlling the system in response to commands received from external to the system.

24. The apparatus of claim 18, wherein the means for modifying includes means for replacing a portion of the fuzzy logic program containing a previous range of values that correspond to operation of the device previously in the system, with a new range of values that correspond to operation of the new device.

25. An apparatus for operating a system controlled by a fuzzy logic program, the apparatus comprising:

a control circuit having an input that receives an indication that a device previously within the system has been replaced with a new device, a first output that controls the system including the new device, the control circuit determining data corresponding to the new device and providing the corresponding data at a second output of the control circuit;

said control circuit including a circuit for operating the system between two identified points of operation, a circuit for reading measurement data elements corresponding to the two identified points of operation, and a circuit for preparing modifying rules based upon the measurement elements corresponding to the two identified points of operation;

a memory circuit having an input coupled to the output of the control circuit, the memory circuit containing a fuzzy logic program modified in response to the corresponding data; and a processing circuit, coupled to the memory circuit, the processing circuit operating the system in accordance with the modified fuzzy logic program.

26. The apparatus of claim 25, wherein:

the processing circuit is further coupled to the control circuit; and the processing circuit modifies a membership function of the fuzzy logic program in response to the corresponding data.

27. The apparatus of claim 25, wherein:

the processing circuit is further coupled to the control circuit; and the processing circuit modifies a rule of the fuzzy logic program in response to the corresponding data.

28. The apparatus of claim 25, wherein the control circuit controls the system so that data that is output from the new device ranges between two predetermined points of operation.

29. The apparatus of claim 25, wherein the control circuit automatically controls the system in response to a calibration program that is included within the system.

30. The apparatus of claim 25, wherein the control circuit controls the system in response to commands received from external to the system.

31. The apparatus of claim 25, wherein:

the processing circuit is further coupled to the control circuit; and the processing circuit replaces a portion of the fuzzy logic program containing a previous range of values that correspond to operation of the device previously in the system, with a new range of values that correspond to operation of the new device.

32. The apparatus of claim 31, wherein the control circuit controls the system so that the new device outputs values that vary across the new range of values.

33. A method for managing an electronic system having a central processing unit, a machine, a microprocessor and memory, and at least one measurement sensor, the machine being controlled by the microprocessor according to a fuzzy logic program, the method comprising the steps of:

preparing membership functions and recording the membership functions in the memory, the membership functions setting up correspondence between measurement data elements and coefficients of membership of the measurement data elements in measurement brackets;

preparing IF-THEN rules and recording the rules in the memory of the microprocessor, for the control of the machine as a function of values of the membership coefficients, reading measurement data elements delivered by the at least one measurement sensor, computing a result of the rules for the measurement data elements read in the step of reading;

controlling the machine in accordance with the result of the IF-THEN rules;

replacing at least one of the at least one measurement sensor and the machine; and adjusting the electronic system after the step of replacing including the steps of:

operating the system between two identified points of operation reading measurement data elements corresponding to the two identified points of operation;

calculating modifying rules based upon the measurement data elements corresponding to the two identified points of operation;

modifying both the membership functions and the IF-THEN rules as a function of the modifying rules; and operating the system with the modified rules.

34. The method of claim 33, wherein:

the measurement data elements corresponding to the two identified points of operation are transmitted to the central processing unit;

the central processing unit prepares the modifying rules; and the central processing unit transmits the modifying rules to the microprocessor.

35. The method of claim 33 wherein:

the microprocessor and memory are provided with a program to activate the machine as a function of instructions received from an entity external to the machine; and the system is controlled to operate between the two identified points of operation in response to a control keyboard connected to the microprocessor.

36. The method of claim 33 wherein:

the microprocessor and memory are provided with a program to activate the machine as a function of instructions received from the exterior, and the system is controlled to operate between the two identified points of operation in response to a program recorded in the central processing unit.

37. The method of claim 33, wherein:

the at least one sensor includes a plurality of sensors, and wherein the step of reading measurement data elements corresponding to the two identified points of operation includes reading from each of the plurality of sensors.

38. The method of claim 33, wherein the at least one sensor is duplicated to calibrate the signals of a sensor as a function of the signals of another sensor.

39. The method of claim 33 wherein the central processing unit is connected to the microprocessor by a local network.

40. A method according to claim 33 wherein the IF-THEN rules and membership functions are modified locally at the memory.

41. A method for managing an electronic system having a central processing unit, a machine, a microprocessor and memory, and at least one measurement sensor, the machine being controlled by the microprocessor according to a fuzzy logic program, the method comprising the acts of:

preparing membership functions and recording the membership functions in the memory, the membership functions setting up correspondence between measurement data elements and coefficients of membership of the measurement data elements in measurement brackets;

preparing rules and recording the rules in the memory of the microprocessor, for the control of the machine as a function of values of the membership coefficients, reading measurement data elements delivered by the at least one measurement sensor;

computing a result of the rules for the measurement data elements;

controlling the machine in accordance with the result of the rules;

replacing at least one of the at least one measurement sensor and the machine; and adjusting the electronic system after the step of replacing including the steps of:

operating the system between two identified points of operation reading measurement data elements corresponding to the two identified points of operation;

providing modifying rules based upon the measurement data elements corresponding to the two identified points of operation;

providing at least one additional membership function and modifying at least one of the rules as a function of the modifying rules; and operating the system with the modified rules.

42. The method of claim 41, wherein:

the measurement data elements corresponding to the two identified points of operation are transmitted to the central processing unit;

the central processing unit prepares the modifying rules; and the central processing unit transmits the modifying rules to the microprocessor.

43. The method of claim 41 wherein:

the microprocessor and memory are provided with a program to activate the machine as a function of instructions received from an entity external to the machine; and the system is controlled to operate between the two identified points of operation in response to a control keyboard connected to the microprocessor.

44. The method of claim 41 wherein:

the microprocessor and memory are provided with a program to activate the machine as a function of instructions received from the exterior, and the system is controlled to operate between the two identified points of operation in response to a program recorded in the central processing unit.

45. The method of claim 41, wherein:

the at least one sensor includes a plurality of sensors, and wherein the step of reading measurement data elements corresponding to the two identified points of operation includes reading from each of the plurality of sensors.

46. The method of claim 41, wherein the at least one sensor is duplicated to calibrate the signals of a sensor as a function of the signals of another sensor.

47. The method of claim 41 wherein the central processing unit is connected to the microprocessor by a local network.

48. A method according to claim 41 wherein the rules and membership functions are modified locally at the memory.

49. The method of claim 1 wherein the act of modifying at least one of the membership functions further comprises modifying the at least one of the membership functions partially as of result of the system being controlled to operate between the two identified points of operation by an operator.

50. The method of claim 9 wherein the act of changing the fuzzy logic program further comprises modifying at least one of the membership fnctions partially as a result of the system being controlled to operate between the two identified points of operation by an operator.

51. The method of claim 33 wherein the act of modifying at least one of the membership functions further comprises modifying the at least one of the membership functions partially as a result of the system being controlled to operate between the two identified points of operation by an operator.

* * * * *